United States Patent
Konanur et al.

(10) Patent No.: US 10,579,946 B2
(45) Date of Patent: Mar. 3, 2020

(54) COMPUTATION OF OPTIMAL INVENTORY TARGETS IN BILL-OF-MATERIALS IN A MULTI-ECHELON SUPPLY CHAIN

(71) Applicant: JDA Software Group, Inc., Scottsdale, AZ (US)

(72) Inventors: Chandrashekar Srikantiah Konanur, North Potomac, MD (US); Ganesh Muthusamy, Tamil Nadu (IN); Probal Bardhan, Hyderabad (IN); Ardyanto Iskandar Alam, Centreville, VA (US)

(73) Assignee: JDA Software Group, Inc., Scottsdale, AZ (US)

( * ) Notice: Subject to any disclaimer, the term of this patent is extended or adjusted under 35 U.S.C. 154(b) by 180 days.

(21) Appl. No.: 15/983,987

(22) Filed: May 18, 2018

(65) Prior Publication Data

US 2018/0268330 A1    Sep. 20, 2018

Related U.S. Application Data

(63) Continuation of application No. 13/327,718, filed on Dec. 15, 2011, now Pat. No. 9,978,026.

(51) Int. Cl.
*G06Q 10/06* (2012.01)
*G06Q 10/04* (2012.01)
*G06Q 10/08* (2012.01)

(52) U.S. Cl.
CPC ......... *G06Q 10/0631* (2013.01); *G06Q 10/04* (2013.01); *G06Q 10/0875* (2013.01)

(58) Field of Classification Search
CPC ................... G06Q 10/0875; G06Q 10/0631
See application file for complete search history.

(56) References Cited

U.S. PATENT DOCUMENTS

| | | | |
|---|---|---|---|
| 5,946,662 A | 8/1999 | Ettl et al. | |
| 7,499,766 B2 | 3/2009 | Knight et al. | |
| 7,853,462 B2 | 12/2010 | Dogan et al. | |
| 8,515,835 B2 | 8/2013 | Wu et al. | |
| 2006/0235557 A1* | 10/2006 | Knight | G06Q 10/087 700/103 |
| 2012/0054076 A1* | 3/2012 | Wu | G06O 10/087 705/28 |

* cited by examiner

*Primary Examiner* — A. Hunter Wilder
(74) *Attorney, Agent, or Firm* — Spencer Fane LLP; Steven J. Laureanti

(57) ABSTRACT

A system and method is disclosed for computing optimal inventory targets in bill of materials in a multi-echelon supply chain. The system includes one or more memory units and on or more processing units collectively configured to determine a delay time from at least one second plan level node in an at least second indenture plan level to at least one first plan level node in a first indenture plan level. The one or more memory units and on or more processing units is further collectively configured to determine a delay time from the at least one first plan level node in the first indenture plan level to a finished good.

15 Claims, 13 Drawing Sheets

COMPUTATION OF OPTIMAL INVENTORY TARGETS IN BILL-OF-MATERIALS IN A MULTI-ECHELON SUPPLY CHAIN

CROSS-REFERENCE TO RELATED APPLICATIONS

This application is a continuation of U.S. patent application Ser. No. 13/327,718, filed on Dec. 15, 2011, entitled "Computation of Optimal Inventory Targets in Bill-of-Materials in a Multi-Echelon Supply Chain." U.S. patent application Ser. No. 13/327,718 is assigned to the assignee of the present application. The subject matter disclosed in U.S. patent application Ser. No. 13/327,718 is hereby incorporated by reference into the present disclosure as if fully set forth herein.

TECHNICAL FIELD

This invention relates generally to the field of inventory optimization across a supply chain network, and more particularly to enablement of companies to extend optimization of inventory targets to components and subordinates level to meet service level targets for finished goods by following continuous review policy.

BACKGROUND

A supply chain network may have one or more locations that receive items from suppliers and distribute within a supply chain network in order to meet the service level requirement for each location. These items may be raw materials, subassemblies or finished goods. Service level targets are typically measured at a finished goods level to meet customer demands. These service level targets are dependent on the inventory kept across the entire supply chain, including the components and subordinates used to make the finished goods. The objective of minimizing total supply chain cost, however, conflicts with typical service level constraints. Because variability exists at all levels in the supply chain, this is a stochastic problem. For example, variability may occur at forecast errors in finished goods at the customer level, distribution lead-time variability in the network, or variability in the manufacturing processes, vendor service variability for procured items. Therefore, computing optimal safety stock and inventory targets to cover all these variabilities in a connected supply chain is a complex stochastic domain problem for any inventory planner.

Prior solutions are incapable of performing optimization for inventory throughout the entire bill-of-material, and are instead limited to merely the finished goods level. Such computations fail to consider the variability that exists through the components and subordinates level. Furthermore, such computations fail to suggest the right safety stock or inventory targets at bill-of-material levels. As a result, users of such computation, stock higher finished goods, but may often be "out-of-sock." Therefore, prior solutions have proven inadequate.

SUMMARY

A computer-implemented system for computing optimal inventory targets in bill of materials in a multi-echelon supply chain is disclosed. The system includes one or more memory units and on or more processing units collectively configured to determine a delay time from at least one second plan level node in an at least second indenture plan level to at least one first plan level node in a first indenture plan level. The one or more memory units and on or more processing units is further collectively configured to determine a delay time from the at least one first plan level node in the first indenture plan level to a finished good.

A computer-implemented method of optimal inventory targets in bill of materials in a multi-echelon supply chain is disclosed. The method provides for determining, by a computer, a delay time from at least one second plan level node in an at least second indenture plan level to at least one first plan level node in a first indenture plan level. The method further provides for determining, by the computer, a delay time from the at least one first plan level node in the first indenture plan level to a finished good.

A computer-readable medium embodied with software for solving supply chain planning problems is also disclosed. The software when executed using one or more computers is configured to determine a delay time from at least one second plan level node in an at least second indenture plan level to at least one first plan level node in a first indenture plan level. The software is further configured to determine a delay time from the at least one first plan level node in the first indenture plan level to a finished good.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Various embodiments presented herein take advantage of cheaper inventory and/or holding cost at a components level than finished goods, while maintaining the same service level. This may be accomplished with minimal costs, or with a high level of service with the same cost. Various embodiments may further help delay a point at which the final product is to be configured or assembled, thereby increasing the flexibility to handle the changing demand for the multiple products. Various embodiments may also aid in setting inventory targets at a components level. This, in turn, may also be helpful for inventory managers to have a contact with third party suppliers maintaining stocks, which then helps to avoid "stock outs." Furthermore, approaches described herein may be desirable alternative for a manufacturer who wants to move away from a "make to stock" environment.

Figure 1:
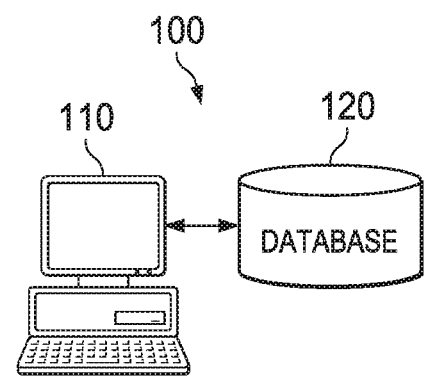
FIG. 1 is a block diagram illustrating an example system in accordance with a preferred embodiment.

FIG. 1 is a block diagram illustrating an example system 100 in accordance with a preferred embodiment. System 100 comprises a computer 110 and a database 220. System 100 may be coupled with one or more supply chain entities of a supply chain network using one or more local area networks (LANs), metropolitan area networks (MANs), wide area networks (WANs), such as, for example, the Internet, or any other appropriate wire line, wireless, or other links. Although a single computer 110 and a single database 220, are shown and described; embodiments contemplate any number of computers and/or any number of databases, according to particular needs. In addition, or as an alternative, system 100 may be integral to or separate from the hardware and/or software of any one of the one or more supply chains entities.

In one embodiment, computer 110 includes any suitable input device, such as a keypad, mouse, touch screen, microphone, or other device to input information. An output device conveys information associated with the operation of system 100, including digital or analog data, visual information, or audio information. Computer 110 includes fixed or removable non-transitory computer-readable storage media, such as, for example, magnetic computer disks, CD-ROM, or other suitable media to receive output from and provide input to system 100. Computer 110 includes one or more processors and associated memory to execute instructions and manipulate information according to the operation of system 100.

Although a single computer 110 is shown in FIG. 1, system 100 may operate on separate computers 110 or may operate on one or more shared computers 110. Each of these one or more computers 110 may be a work station, personal computer (PC), network computer, notebook computer, personal digital assistant (PDA), cell phone, telephone, wireless data port, or any other suitable computing device.

In one embodiment, the memory associated with one or more computers 110 comprises any of a variety of data structures, arrangements, and/or compilations configured to store and facilitate retrieval of information. The memory may, for example, comprise one or more volatile or non-volatile memory devices. Although the memory is described as residing within one or more computers 110, the memory may reside in any location or locations that are accessible by one or more computers 110 or the one or more processors. The memory may store and the one or more processors may process any suitable information to perform operations in, for example, system 100.

Database 120 comprises one or more databases or other data storage arrangements at one or more locations, local to, or remote from, computer 110. Database 120 may be coupled with computer 110 using one or more local area networks (LANs), metropolitan area networks (MANs), wide area networks (WANs), such as, for example, the Internet, or any other appropriate wire line, wireless, or other links. Database 120 stores data that may be used by computer 110.

In an embodiment, optimal inventory targets for all elements in a multi-echelon and multi-indenture supply chain are created. Optimal inventory targets may include but are not limited to finished goods, subassemblies, components, raw materials, or any article or assemblies within the realm of the organization utilizing the supply chain computation or computations. Demand and lead-time variability across an entire supply chain may also be propagated in various embodiments. Improving inventory levels to provide the highest benefit for the service level at the lowest possible cost may also be iteratively solved in embodiments. The problem solved by various embodiments may be solved in a completely connected supply chain measuring the impact of every inventory added to the supply chain at each level for each iteration. Various embodiments may also utilize methodology to compute highly optimal plans in a short run time by propagating a net-change in the plans for each iteration across the supply chain.

Embodiments of this invention allow for optimal safety stock and inventory targets to be suggested at all levels in a supply chain. This may provide visibility to the optimal inventory targets at the component and subordinate level, levels not previously able to be calculated. Organizations may then know where an actual problem in a supply chain exists. Furthermore, implementation of inventory targets at all levels may solve complete supply chain problems such that a problem at a lower service level is solved holistically. Since inventory costs may be lower at the raw material level as compared to finished goods, this may then result in a reduction in total costs. In addition, embodiments may also eliminate some of the excess safety stock levels at the finished goods, thus potentially avoiding markdowns and/or obsoleteness of finished goods.

Figure 2:
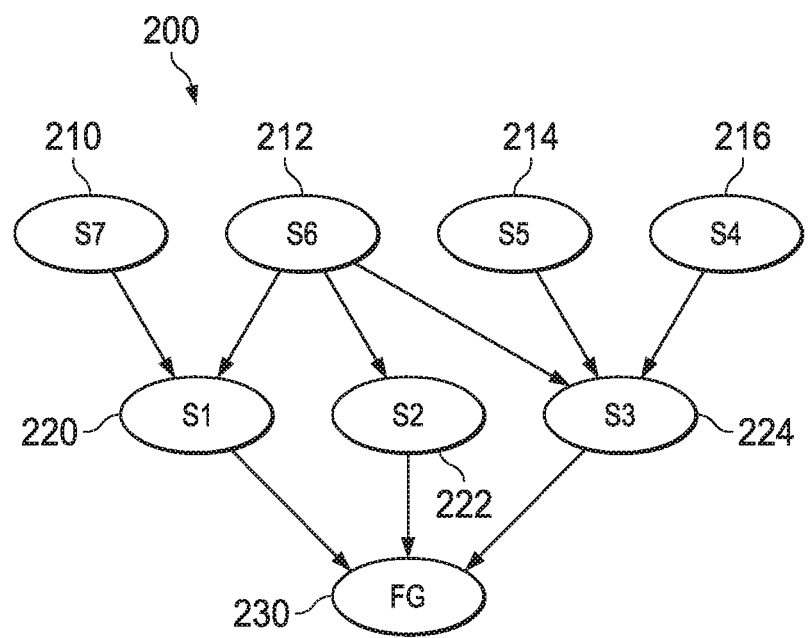
FIG. 2 is a diagram illustrating an example supply chain in accordance with a preferred embodiment.

FIG. 2 is a diagram illustrating an example supply chain 200 in accordance with a preferred embodiment. By way of example and not limitation, an embodiment may comprise a bill-of-material (BOM) supply chain network comprising subordinates of S7 210, S6 212, S5 214, and S4 216; components of S1 220, S2 222, and S3 224; and a finished good (FG) 230. A numerical illustration of such a BOM is shown below. Other embodiments may comprise any number of subordinates, components, and finished goods connected in any number of combinations. The subordinates, components, and finished goods may comprise any type of material, manufactured good, product, and the like as is necessary or utilized in a supply chain. The nodes for the supply chain may all be in the same location, or may be in any variety of locations. As shown below, S7 210 may input into S1 220; S6 212 may input into S1 220, S2 222, and S3 224; S5 214 may input into S3 224; and S4 216 may input into S3 224. S1 220, S2 222, and S3 224 may be utilized to create the FG 230.

Input parameters of the BOM of FIG. 2 are listed in TABLE 1. Numbers utilized in TABLE 1 are for purposes of example only. In this input parameter table, destinations, mean lead time (LT) in days, LT standard deviation (SD), mean daily demand (MDD), and mean square error (MSE) are listed for each corresponding source. For example, source S1 220 has a destination of FG 230. The mean LT required for inputting this source is 5 days, while the SD for this lead time is 2 days. The MDD for inputting S1 to FG is 200, while the MSE is 54975.

TABLE 1

| Source | Destination | Mean LT in days | LT SD in days | MDD | MSE |
|---|---|---|---|---|---|
| S1 | FG | 5 | 2 | 200 | 54975 |
| S2 | FG | 2 | 5 | 400 | 60457 |
| S3 | FG | 3 | 6 | 250 | 254958 |
| S4 | S3 | 6 | 2 | 245 | 56978 |
| S5 | S3 | 7 | 1 | 345 | 9567 |
| S6 | S3 | 3 | 8 | 268 | 56897 |
| S6 | S2 | 5 | 3 | 545 | 5759 |
| S6 | S1 | 1 | 7 | 576 | 25643 |
| S7 | S1 | 3 | 4 | 468 | 6587 |

TABLE 2

| Source | Destination | Mean LT in days | LT SD in days | MDD | MSE | PPV | PPV SD |
|---|---|---|---|---|---|---|---|
| S4 | S3 | 6 | 2 | 245 | 56978 | 1470 | 762.868272 |
| S5 | S3 | 1 | 7 | 345 | 9567 | 345 | 2416.97993 |
| S6 | S3 | 3 | 8 | 268 | 56897 | 804 | 2183.44384 |
| S6 | S2 | 5 | 3 | 545 | 5759 | 2725 | 1643.78222 |
| S6 | S1 | 1 | 5 | 576 | 25643 | 576 | 2884.44847 |
| S7 | S1 | 3 | 4 | 468 | 6587 | 1404 | 1877.27063 |

Determining delay from the $2^{nd}$ indenture to the $1^{st}$ indenture may further comprise computing the Coefficient of Variation (CV) for each source and destination, as shown in TABLE 3. An equation which is used to compute CV is given below:

$$CV = \left(\frac{PPV\ SD}{PPV}\right)$$

TABLE 3

| Source | Destination | Mean LT in days | LT SD in days | MDD | MSE | PPV | PPV SD | CV |
|---|---|---|---|---|---|---|---|---|
| S4 | S3 | 6 | 2 | 245 | 56978 | 1470 | 762.868272 | 0.518958 |
| S5 | S3 | 1 | 7 | 345 | 9567 | 345 | 2416.97993 | 7.005739 |
| S6 | S3 | 3 | 8 | 268 | 56897 | 804 | 2183.44384 | 2.715726 |
| S6 | S2 | 5 | 3 | 545 | 5759 | 2725 | 1643.78222 | 0.603223 |
| S6 | S1 | 1 | 5 | 576 | 25643 | 576 | 2884.44847 | 5.007723 |
| S7 | S1 | 3 | 4 | 468 | 6587 | 1404 | 1877.27063 | 1.337087 |

In various embodiments, the method or systems may comprise any number of steps or acts. In an embodiment, a first step may comprise determining a delay from a $2^{nd}$ indenture to a $1^{st}$ indenture plan level. In the example presented above, this step may comprise determining the delay from S4 216 to S3 224, S5 214 to S3 224, S6 212 to S3 224, S6 212 to S2 222, and S7 210 to S1 220.

Determining a delay from the $2^{nd}$ indenture to the $1^{st}$ indenture may first comprise computing the procurement problem variable (PPV) and PPV SD for each source and destination. PPV may also relate to the lead time variation. Examples of the PPV and PPV standard deviations are shown in TABLE 2. An equation which is used to compute PPV and PPV SD is given below:

$$PPV\ SD = \sqrt{\mu_L \sigma_D^2 + \mu_D^2 \sigma_L^2}$$

Where, $\mu_D$: Mean Daily Demand (MDD)

$\sigma_D^2$: Mean Square Error (MSE)

$\mu_L$: Mean Lead Time (Mean LT)

$\sigma_L$: Lead Time SD (LT SD)

The value of CV based on the PPV and PPV SD or variance may be the same as the CB based on LT and LT SD. In the example provided, these values are approximately equal. In other circumstances, however, the values may not always be approximately equal. Computation of CV based on PPV and PPV SD will be effective as it has demand and its variability along with lead time and its variability CV based on LT and LT SD is given below:

$$CV = \left(\frac{LT\ SD}{Mean\ LT}\right)$$

TABLE 4

| Source | Destination | CV based on PPV and PPV SD | CV based on LT and LT SD |
|---|---|---|---|
| S4 | S3 | 0.518958 | 0.333333 |
| S5 | S3 | 7.005739 | 7 |
| S6 | S3 | 2.715726 | 2.666667 |
| S6 | S2 | 0.603223 | 0.6 |

TABLE 4-continued

| Source | Destination | CV based on PPV and PPV SD | CV based on LT and LT SD |
|---|---|---|---|
| S6 | S1 | 5.007723 | 5 |
| S7 | S1 | 1.337087 | 1.333333 |

Determining a delay from the $2^{nd}$ indenture to the $1^{st}$ indenture may further comprise computing the delay in 2 sigma limit for the combination have CB less than or equal to 2. In an embodiment, if the CV for a source-to-destination is greater than 2, than the CB may be used as a sigma limit (Z). As shown in the table immediately following this paragraph, S5-S3 is the greatest value of mean LT+Z LT SD. S5-S3 is, therefore, the "bottleneck" of the $2^{nd}$ indenture to $1^{st}$ indenture level.

TABLE 5

| Source | Destination | Mean LT in days | LT SD in days | CV | Mean LT + Z * LT SD |
|---|---|---|---|---|---|
| S4 | S3 | 6 | 2 | 0.518958 | 10 |
| S5 | S3 | 1 | 7 | 7.005739 | 50.04017 |
| S6 | S3 | 3 | 8 | 2.715726 | 24.72581 |
| S6 | S2 | 5 | 3 | 0.603223 | 11 |
| S6 | S1 | 1 | 5 | 5.007723 | 26.03862 |
| S7 | S1 | 3 | 4 | 1.337087 | 11 |

In an embodiment, a first step may comprise determining a delay from the $1^{st}$ indenture to the finished good. In the example presented above, this step may comprise determining the delay from S1 to FG, S2 to FG, and S3 to FG. Determining the delay from $1^{st}$ indenture to the FG may comprise adding the bottleneck LT and LT SD from the previous indenture level. This addition may, in some embodiments, assume no correlation. Addition of the bottleneck LT and LT SD from the previous indenture level is illustrated in the table immediately following this paragraph. For example, for S1 to FG, the mean LT in days is 5+1, the max delay from S7 and S6. The LT SD in days is also the max delay from S7 and S6.

TABLE 6

| Source | Destination | Mean LT in days | LT SD in days | MDD | MSE |
|---|---|---|---|---|---|
| S1 | FG | 5 + 1 | 2 + 5 | 200 | 54975 |
| S2 | FG | 2 + 5 | 5 + 3 | 400 | 60457 |
| S3 | FG | 3 + 1 | 6 + 7 | 250 | 254958 |

Determining the delay from $1^{st}$ indenture to the FG may further comprise determining the PPV and PPV SD, as illustrated in the table following this paragraph. Determination of these values may be computed similar to determining the PPV and PPV SD in the previous step.

TABLE 7

| Source | Destination | Mean LT in days | LT SD in days | MDD | MSE | PPV | PPV SD |
|---|---|---|---|---|---|---|---|
| S1 | FG | 6 | 7 | 200 | 54975 | 1200 | 1513.225 |
| S2 | FG | 7 | 8 | 400 | 60457 | 2800 | 3265.455 |
| S3 | FG | 4 | 13 | 250 | 254958 | 1000 | 3403.283 |

Determining the delay from $1^{st}$ indenture to the FG may further comprise determining the CV, as illustrated in the table following this paragraph. Determination of these values may be computed similar to determining the CV in the previous step.

TABLE 8

| Source | Destination | Mean LT in days | LT SD in days | MDD | MSE | PPV | PPV SD | CV |
|---|---|---|---|---|---|---|---|---|
| S1 | FG | 6 | 9 | 200 | 54975 | 1200 | 1513.225 | 1.261021 |
| S2 | FG | 3 | 12 | 400 | 60457 | 2800 | 3265.455 | 1.166234 |
| S3 | FG | 4 | 13 | 250 | 254958 | 1000 | 3403.283 | 3.403283 |

Determining the delay from $1^{st}$ indenture to the FG may further comprise determining the delay in 2 or CV sigma limit, as illustrated in the table following this paragraph. Determination of these values may be computed similar to determining the 2 or CV sigma limit in the previous step. Accordingly, if the CV is greater than 2, CV may be used as sigma limit (z). From these calculations, S3-FG comprises the largest mean LT+(Z*LT SD) and is therefore the bottleneck of the sources.

TABLE 9

| Source | Destination | Mean LT in days | LT SD in days | CV | Mean LT + (Z * LT SD) |
|---|---|---|---|---|---|
| S1 | FG | 6 | 9 | 1.261021 | 24 |
| S2 | FG | 3 | 12 | 1.166234 | 27 |
| S3 | FG | 4 | 13 | 3.403283 | 48.24267 |

Figure 3:
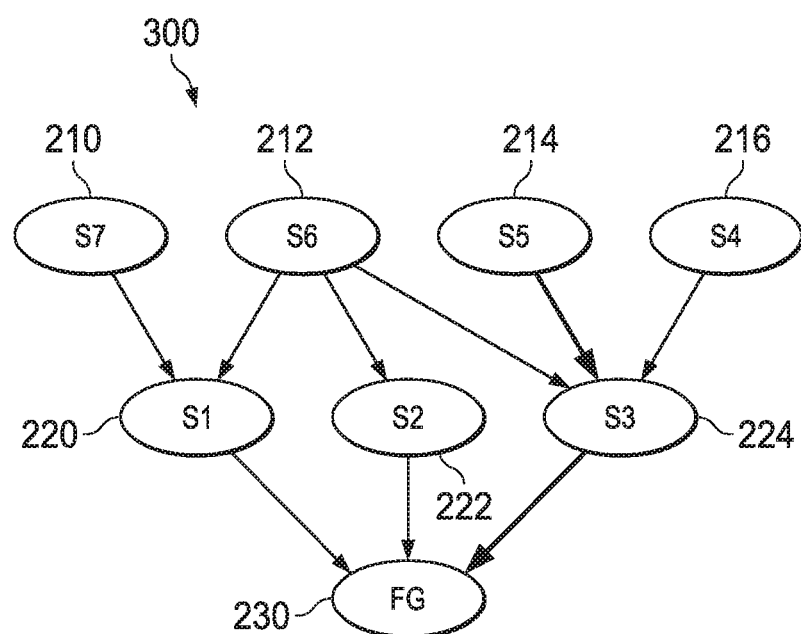
FIG. 3 is a diagram illustrating the overall bottlenecks of a system.
Figure 4:
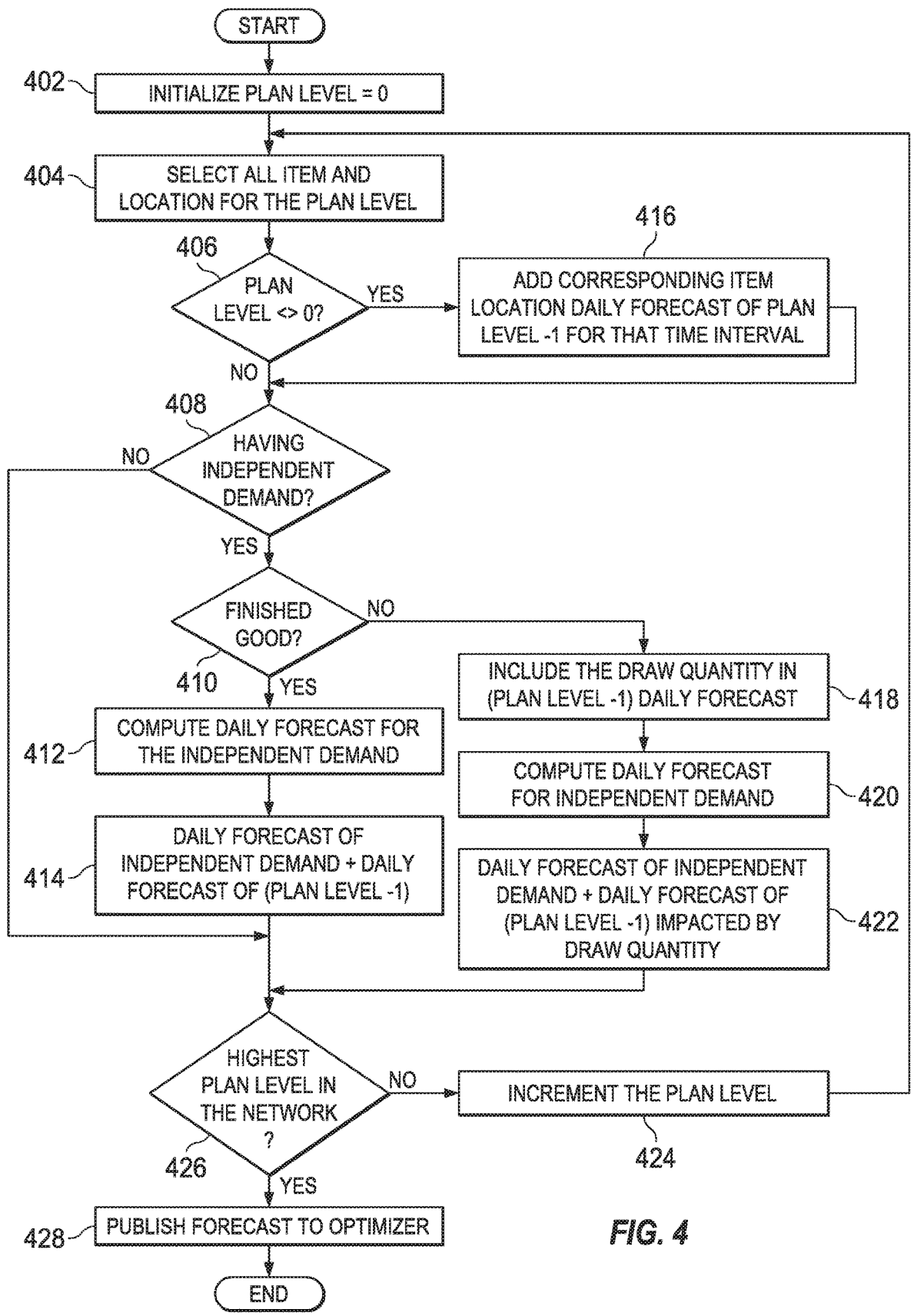
FIG. 4 illustrates a methodology to compute forecast for each item and location for a chain network.

FIG. 3 illustrates supply chain 200 of FIG. 2 highlighting the overall bottlenecks of system 100, bottleneck arcs S5 214 to S3 224, and S3 224 to FG 230. FIG. 4 illustrates an embodiment of the computation mechanism of Mean Daily Demand for every item and location (SKU) in the network including the distribution echelons and bill of material indentures. Here, echelon is referred as plan level. All SKUs are sorted by plan level, the SKU at the final destination location in the network having plan level 0 and the SKU at the top most indenture location (raw material or the first most assembly component's location) having the highest plan level. In an embodiment, the algorithm is started from the lowest plan level (i.e. 0) for a given time interval. For plan level other than 0, the corresponding item's daily forecast from its previous plan level may be added. Alternatively, a determination may be made as to whether the item has independent demand at that particular location. If the independent demand is not available, then a determination may be made as to whether the SKU is at the highest plan level in the network. If not, progression to the next plan level may occur; otherwise publish the forecast for the SKU. If independent demand is available, determine whether it is the finished good. If it is finished good, the daily forecast for the independent demand may be computed and added to the daily forecast for the corresponding item from the previous plan level. Another determination of whether the SKU is at the highest plan level may be made, then followed accordingly as described above. If the SKU is not the finished good, then the draw quantity for the corresponding item for the previous plan level may be considered. The daily forecast may then be computed added to the computed daily forecast for its independent demand. Finally, again determine whether the SKU has the highest plan level and act accordingly.

In an embodiment of the computation mechanism of Mean Daily Demand, the computation may begin by initializing the lowest plan level (i.e. 0) 402. All item and location for the plan level may then be selected 404. A determination of whether the plan level is greater than zero 406 may then be made. If it is not, the computation progresses to determining whether an independent demand is present in the plan level, system, or supply chain 408. If the plan level is less than or greater than zero, corresponding item location daily forecast of plan level −1 for that time interval may be added 416 before the computation progress to determining whether there is an independent demand 408. If there is an independent demand, the computation may progress to determining whether the item is a finished good 410. If the item is not a finished good, the computation may progress to include a draw quantity, or the number of child components that are used to produce parent item, in (plan level −1) daily forecast 418 and a computation of a daily forecast for an independent demand 420. A daily forecast of independent demand plus the daily forecast of (plan level −1) impacted by the draw quantity 422 may then be determined.

If the item is a finished good, the computation may progress to a computation of a daily forecast for the independent demand 412, followed by a determination of the daily forecast of independent demand plus a daily forecast of (plan level −1) 414.

If there is no independent demand (in relation to the determination of 408), or after determination of the daily forecast of independent demand plus daily forecast of (plan level −1) 414 or daily forecast of independent demand plus daily forecast of (plan level −1) impacted by draw quantity 422, the computation may progress to a determination of a whether the level is the highest plan level in the network 426. If it is not the highest plan level in the network, the computation may move to increment the plan level 424 before returning to selection of all item and location for the plan level 404. If the level is the high level in the network, the computation progress to publishing the forecast to the optimizer 428.

Figure 5:
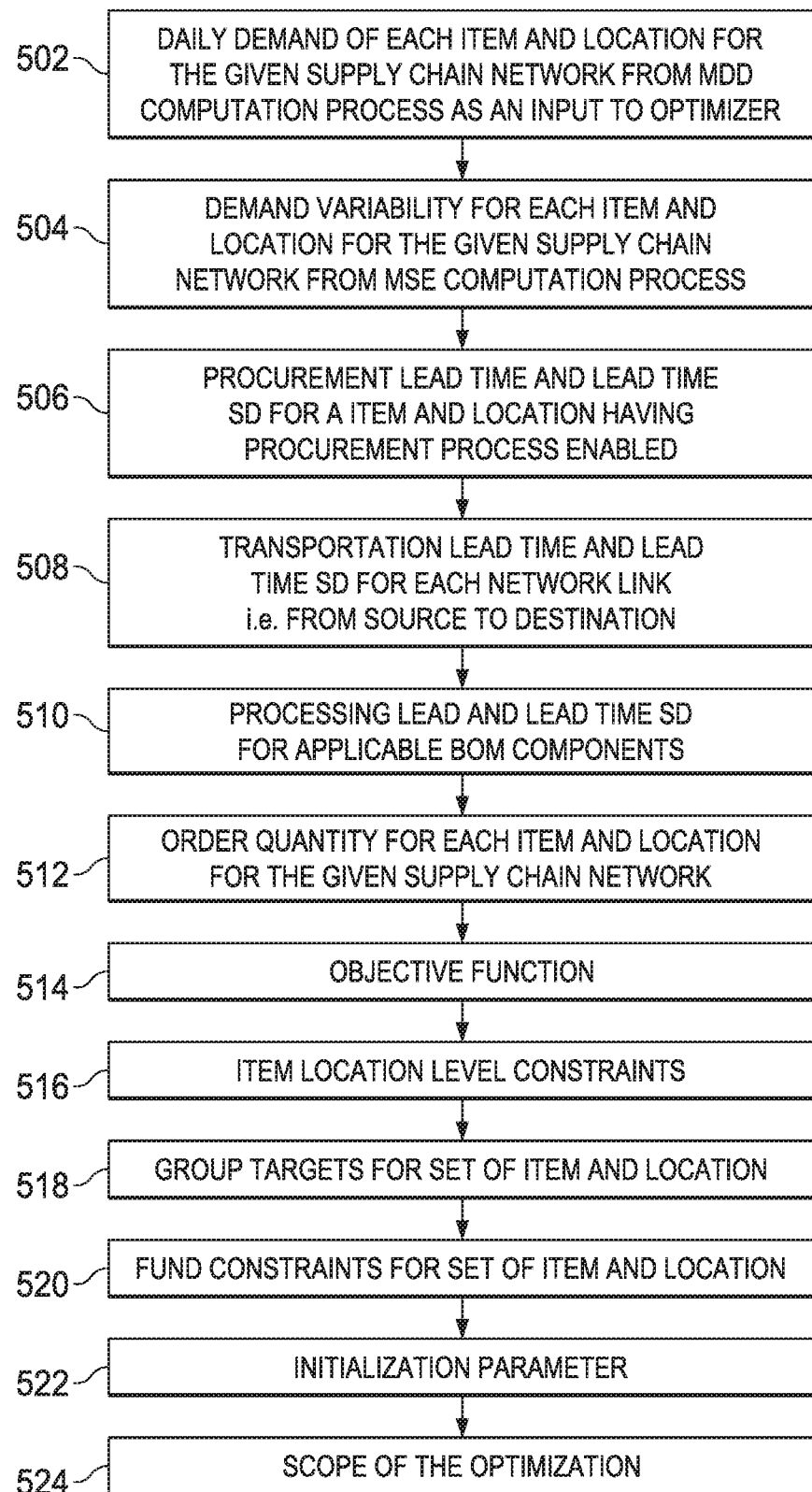
FIG. 5 illustrates parameters required to configure in the optimizer as an input to optimize safety stock for a supply chain network.

FIG. 5 illustrates the input parameters required in an embodiment of an optimization. In an embodiment, one of the input parameters comprises a daily demand of each item and location for the given supply chain network from an MDD computation process 502. Daily demand may be at least one of the key inputs for the optimization. In some embodiments, demand must be propagated to higher level plan levels in the supply chain network. The detailed methodology to compute daily demand for an item at a location is illustrated in FIG. 4.

Figure 7:
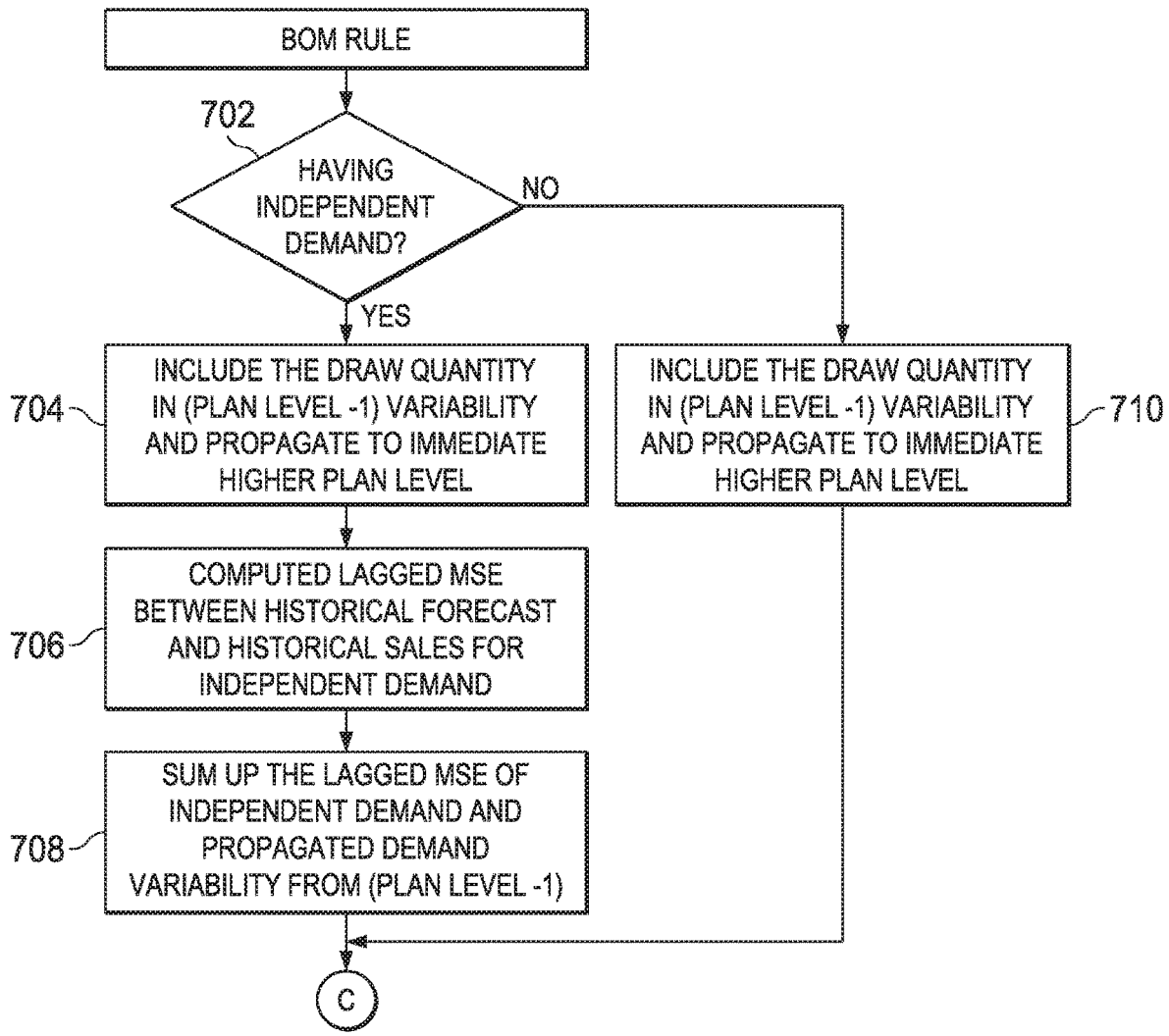
FIG. 7 illustrates a methodology to compute demand variability for BOM components in a supply chain network.
Figure 8:
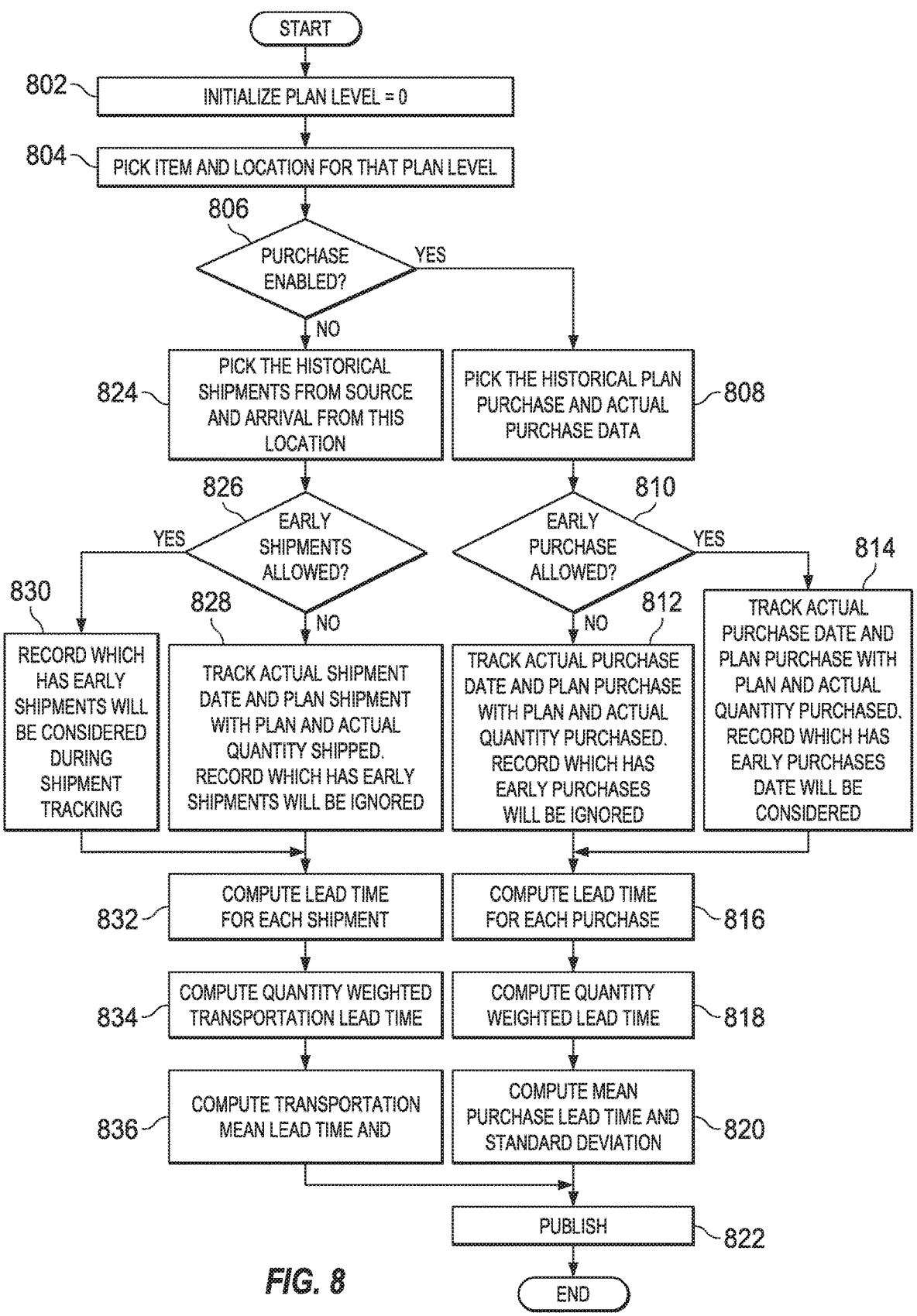
FIG. 8 illustrates a methodology to compute quantity based procurement lead time, procurement standard deviation, transportation lead time and transportation standard deviation.

Similarly, in some embodiments, demand variability has to be propagated to all items and locations 504. Demand variability methodology may comprise a different flexible option to propagate demand variability to higher plan level, which is illustrated in FIGS. 7 and 8. Transportation Lead Time and Standard Deviation 508, procurement Lead time and Standard deviation 506 may be computed from plan and/or actual transactional data. There are options to allow early arrivals to either be considered or not considered in the computation. The complete methodology is illustrated in FIG. 8.

Processing lead time and standard deviation may be required in as an input 510 in some embodiments. It can also be configurable to compute the procurement lead time and standard deviation process. As this novel approach follows continuous review policy, order quantity may be another key parameter that needs to be provided as an input 512 in various embodiments. Moreover, a user may need to select the objective function that drives the optimization 514. In an embodiment, a user or one or more users may be associated with system 100. These one or more users may include, for example, a "planner" handling management and planning of the supply chain and/or one or more related tasks within system 100. In addition, or as an alternative, these one or more users within system 100 may include, for example, one or more computer systems programmed to autonomously handle planning and/or one or more related tasks within system 100. Also, item level constraints 516, group targets 518, and fund constraints 520 may be input and modeled based on business needs of the user. Various embodiments may also allow or require an input of an initialization parameter 522 and or a scope of the optimization 524.

Figure 6A:
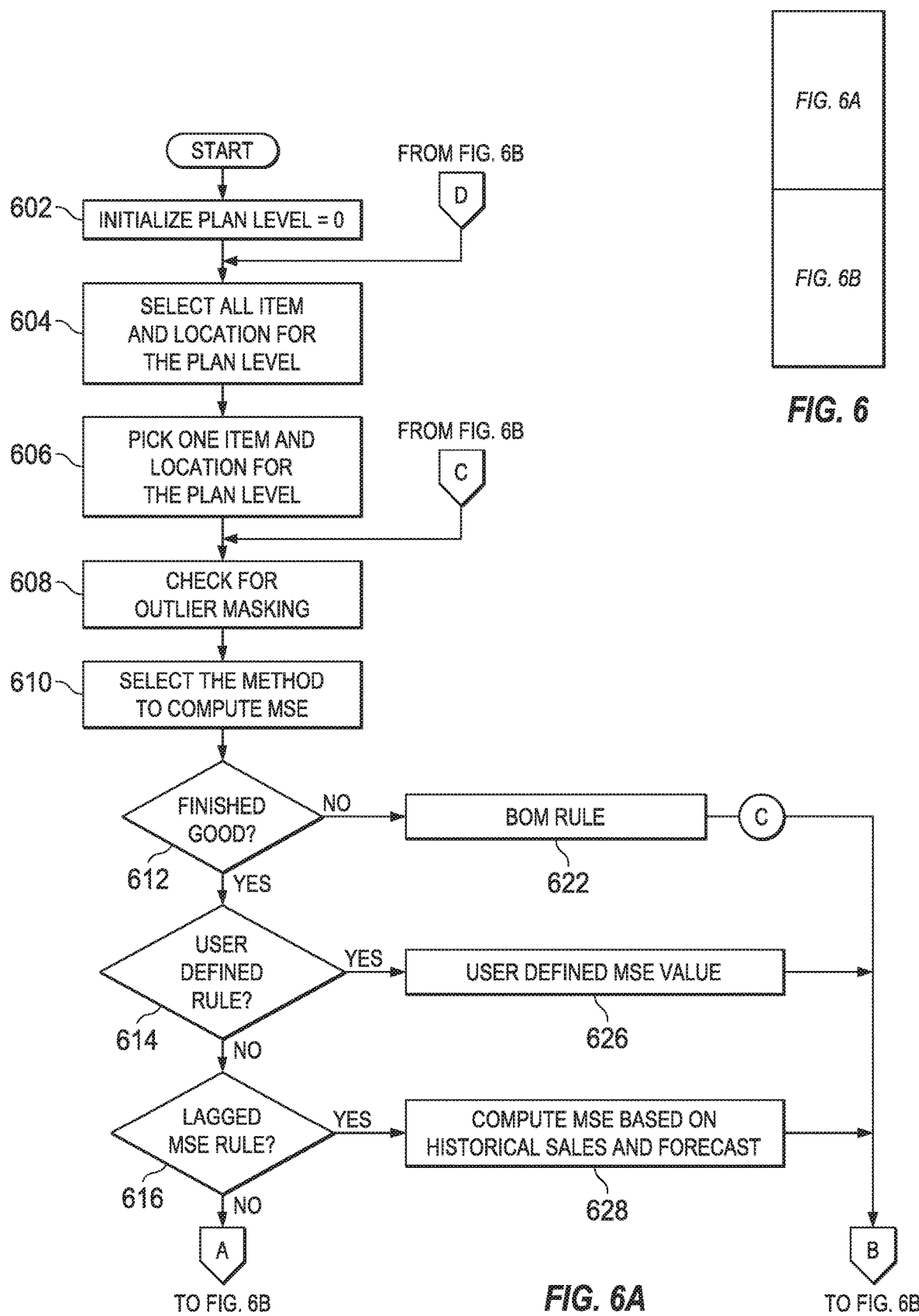
FIG. 6 (depicted as FIGS. 6A and 6B) illustrates a methodology to compute demand variability for each item and location for a supply chain network.
Figure 6B:
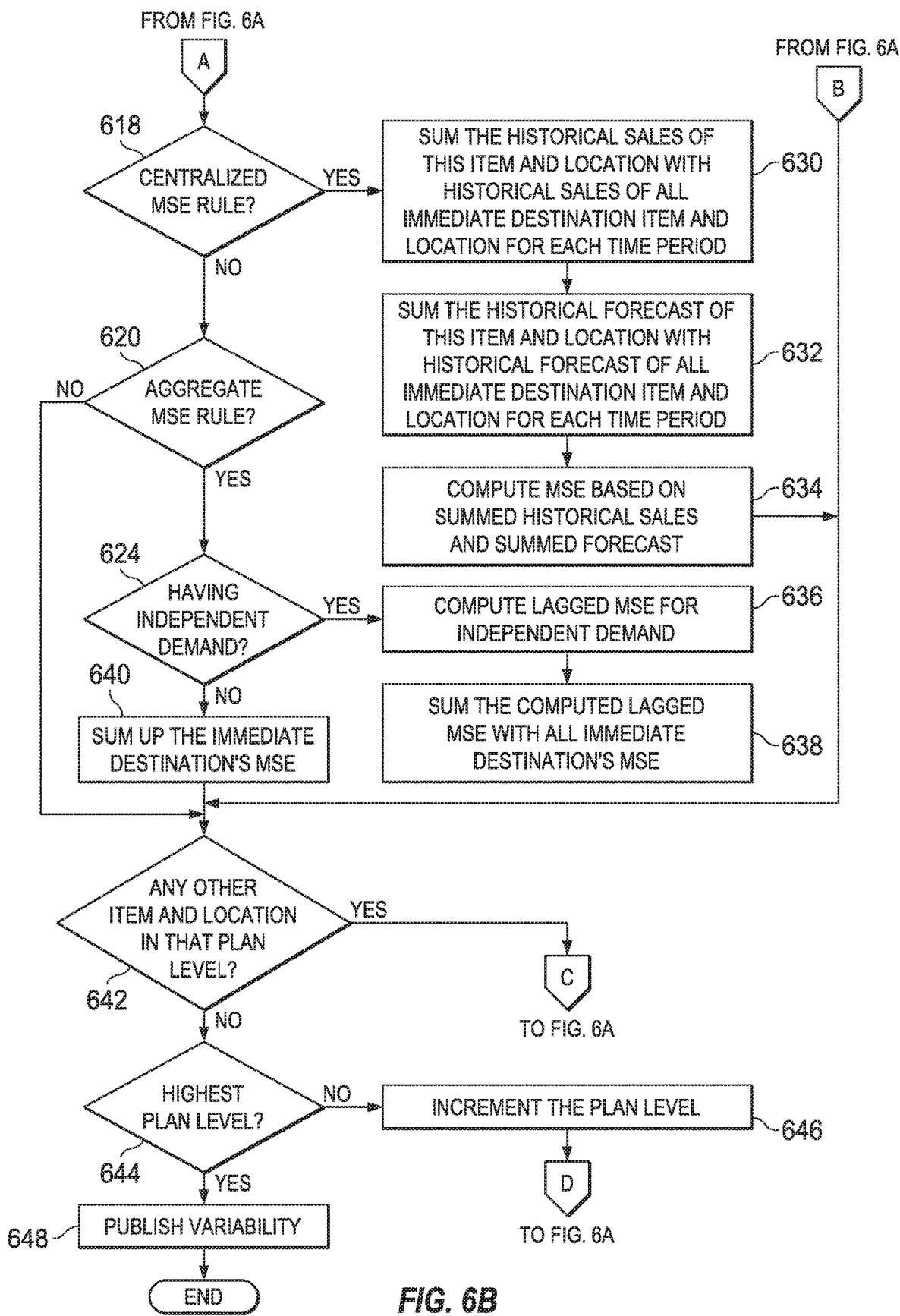

FIGS. 6 (depicted as FIGS. 6A and 6B) and 7 illustrate a computation mechanism of Mean Squared Error of the daily demand for every SKU in the network. All SKUs may be sorted by plan level in an embodiment. The process may be started from the lowest plan level (i.e. 0) for a given time interval. If the SKU is a finished good, then check the method set to compute MSE. If the rule is "User Defined," then consideration of the user-defined value may be made. If the rule is "Lagged MSE," then the MSE based on historical sales and forecasts may be computed. If the rule is "Centralized MSE," then the MSE based on the summed up historical sales and summed up historical forecasts of the previous plan level destination SKUs may be. If the rule is "Aggregate MSE," then if the SKU has independent demand may be determined. If there is independent demand, then its lagged MSE may be computed and summed together with the computed lagged MSEs of the previous plan level destination SKUs. If there is not any independent demand, then the MSE as the sum of the lagged MSEs of the previous plan level destination SKUs may be considered. If the SKU is not a finished good and the rule is "BOM," the draw quantity(s) of the SKU(s) from the previous plan level indenture while calculating the Aggregate MSE may be considered.

Referring specifically to FIG. 6, a plan may be initialized at 0, or the lowest plan level 602. All item and/or locations for the plan level may then be selected 604. One item and/or location for the plan level may then be selected 606, followed by a check for any outlier masking 608. A method for computing the MSE may then be selected 610.

A determination is then made whether the product is finished good 612. If the product is a finished good, the computation may progress to determine whether there is a user-defined rule 614. If there is not a user-defined rule, then computation may progress to determine whether there is lagged MSE rule 616. If there is no lagged MSE rule, then the computation may progress to determine where there is a centralized MSE rule 618. If there is no centralized MSE rule, the computation may progress to determine whether there is an aggregate MSE rule 620. If there is an aggregate MSE rule 620, the computation may progress to determine whether the aggregate MSE rule comprises an independent demand 624. If it does not have an independent demand, then the immediate destination's MSE may be summed up 640. If there is an independent demand, the a lagged MSE for independent demand may be computer 636, then the computed lagged MSE and all immediate destination's MSE may be summed together 638.

If there is a user-defined rule, the computation may progress to determine the user-defined MSE value 26. If there is a lagged MSE rule, the computation may progress to compute the MSE based on historical sales and/or forecasts 628. If there is a centralized MSE, the computation may sum the historical sales of the item and location with historical sales of all immediate destination item and location for each time period 630, sum the historical forecast of the item and location with historical forecast of all immediate destination item and location for each time period 632, and then compute the MSE based on summed historical sales and summed forecast 634. From the user-defined value 626, the computed MSE based on historical sales and forecast 628, computed MSE based on summed historical sales and summed forecast 634, no aggregate MSE rule determination 620, the application of the BOM rule 622, and/or the sum up of the immediate destination's MSE 640, the computation may progress to a determination of whether any other item and location is in that plan level 642. If yes, the computation returns to checking for outlier masking 608. If no, then the computation progresses to determine whether this is the highest plan level 644. If it is not the highest plan level, the computation progresses to increment the plan level 646. If it is the highest plan level, the computation progress to publish the variability 648.

Referring specifically to FIG. 7, a determination is made whether the BOM comprises an independent demand 702. If no, then the computation progresses to include the draw quantity in (plan level −1) variability and propagates to immediate higher plan level 710. If the BOM rule does comprise an independent demand, then the computation includes the draw quantity in (plan level −1) variability and propagates to an immediate high plan level 704. The lagged MSE between the historical forecast and historical sales for independent demand may then be computed 706. The lagged MSE of independent demand and propagated demand variability from (plan level −1) may then be summed together 708.

FIG. 8 illustrates the computation mechanism of procurement and transportation lead times and their standard deviations. All SKUs may be ordered by plan level, and the process may be started from the lowest plan level (i.e. 0) 802 for a given time period. In various embodiments, an item and/or location may be picked or selected for that plan level 804. A determination may then be made whether the SKU is purchase enabled 806. If the SKU is not purchase enabled, then historical shipments from source and arrival from this location may be selected 824. From this, a determination is made whether early shipments are allowed 826. If early shipments are now allowed, the actual shipment date(s) and planned shipment date(s) may be tracked with planned and actual quantity shipped 828. As part of this, any record which has early shipments may be ignored. The lead time for each shipment may then be computed 832. If early shipments are allowed, then a record which has early shipments may be considered during shipment tracking 830 before the lead time for each shipment is computed 832. Once the lead time for each shipment is computed, the quantity weighted transportation lead time may be computed 834. The transportation mean lead time may then be computed 836 before results are published 822.

If the SKU is purchase enabled, then the historical plan purchase and actual purchase data may be selected 808. A determination may then be made whether early purchase is allowed 810. If early purchase is not allowed, then the actual purchase date and plan purchase with plan and actual quantity purchased may be tracked 812. As part of this, any record which has early purchases may be ignored. The lead time for each purchase may then be computed 816. If early purchases are allowed, then the actual purchase date and plan purchase with plan and actual quantity purchased may be tracked 814 before the lead time for each purchase is computed 816. The quantity weighted lead time may then be computed 818, as well as the mean purchased lead time and standard deviation 820. Results may then be published 822.

Figure 9:
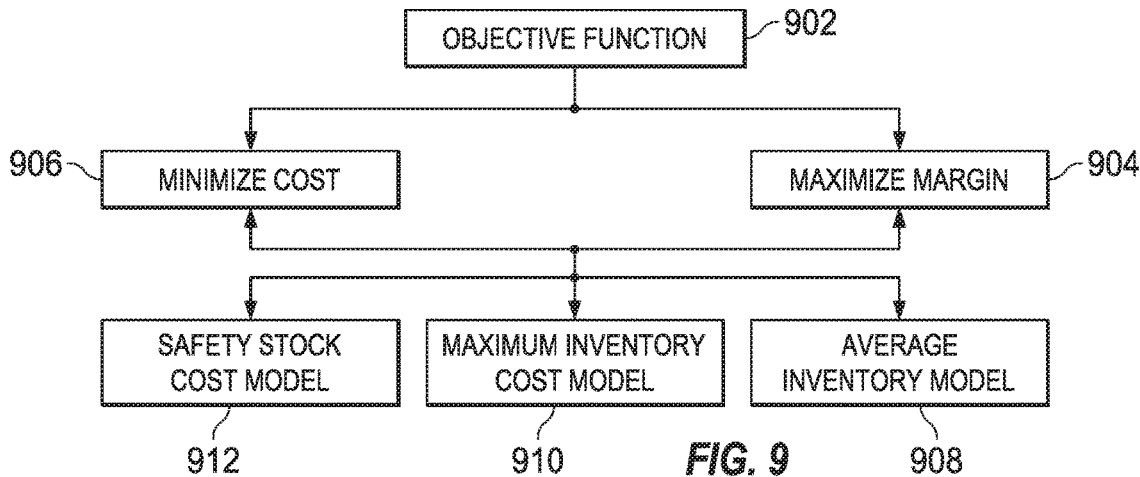
FIG. 9 illustrates different types of objective functions that a user may choose to optimize the safety stock for a supply chain network.

FIG. 9 illustrates the types of objective function 902 that a user can use to drive the optimization. There are two types of optimizations: minimize cost 906 and maximize margin 904. Either or both minimize cost 906 and maximize margin 904 may run on three different cost models: maximum inventory cost model 910, average inventory model 908, or safety stock model 912.

In the maximum inventory cost model 910, a computed cost is associated with the stock level, which is maximum level of inventory in the system. The following equation may be used to compute maximum inventory cost:

$$\text{Maximum Inventory Cost} = \sum_{i}^{N} (S_i)IV_i$$

Here,
i: Identifier used to denote an item and a location.
$S_i$: Stock level for an item and a location
N: Total number of items and locations in the given network
$IV_i$: Inventory Valuation cost of each item and location
In the average inventory cost model 908, a computed cost is associated with the average inventory level. The following equation may be used to compute average inventory cost $$\text{Average Inventory Level Cost} = \sum_{i}^{N} \left(\frac{Q_i + 1}{2} + S_i - Q_i - PPV_i + EBO_i\right)IV_i$$

Here,
i: Identifier used to denote an item and a location.
$S_i$: Stock level for an item and a location
$Q_i$: Reorder Quantity for an item and location
N: Total number of items and locations in the given network
$IV_i$: Inventory Valuation cost of each item and location
$PPV_i$: Problem procurement variable for an item and a location
$EBO_i$: Expected Backorder for an item and a location
In the safety stock cost model, a computed cost is associated with safety stock level. The following equation may be used to compute average inventory cost:

$$\text{Safety Stock Level Cost} = \sum_{i}^{N} (S_i - Q_i - PPV_i)IV_i$$

Figure 10:
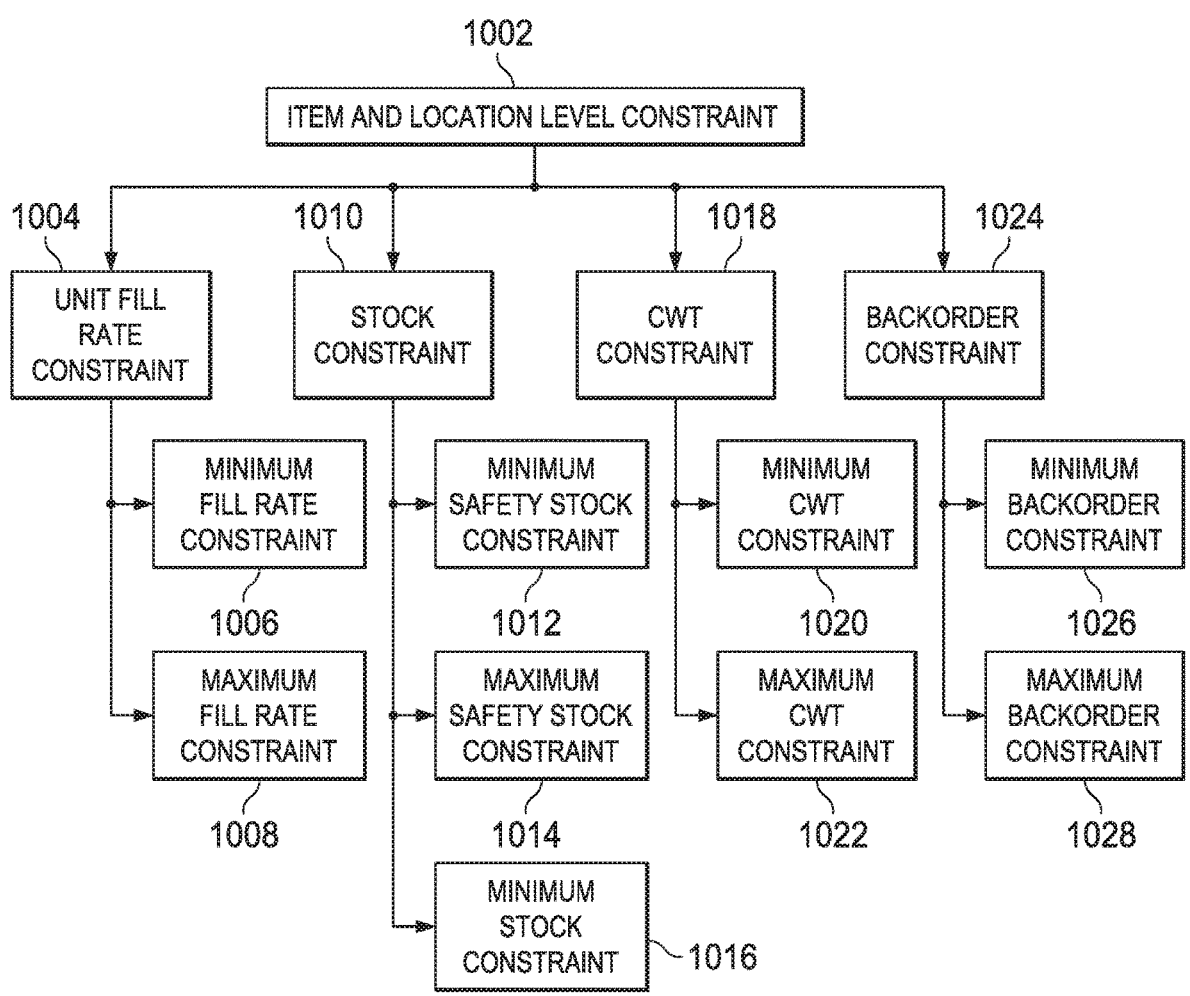
FIG. 10 illustrates different types of item and location level constraints that a user may choose to optimize the safety stock for a supply chain network.
Figure 11:
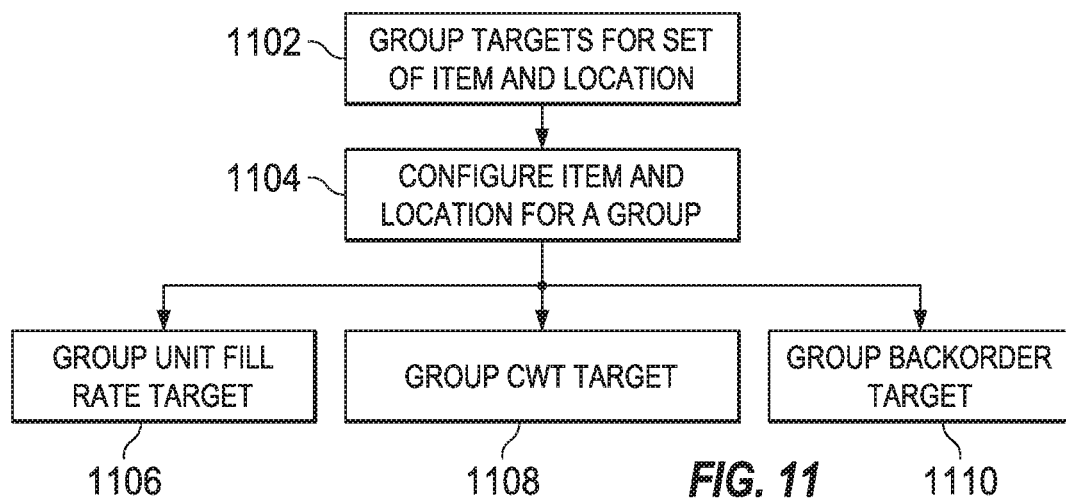
FIG. 11 illustrates different types of group targets that a user may set to optimize the safety stock for the given supply chain network.

Here,
i: Identifier used to denote an item and a location.
$S_i$: Stock level for an item and a location
N: Total number of items and locations in the given network
$IV_i$: Inventory Valuation cost of each item and location
$PPV_i$: Problem procurement variable for an item and a location A business plan needs to be realistic, so it is important to set out in detail the constraints that are likely to act as limits on business activity. FIG. 10 illustrates the different item and location level constraints that users may apply in the process. The user may set lower 1006 and upper 1008 bounds for fill rates, customer wait time (CWT) 1018, backorder (EBO) 1024 and safety stock 1010. Among these constraints, bounds for safety stock are typically harder constraints than any other constraint.

Specifically, the item and location level constraint 1002 may comprise a unit fill rate constraint 1004, a stock constraint 1010, a CWT constraint 1018, or a backorder constraint 1024. The unit fill rate constraint 1004 may comprise a minimum fill rate constraint 1006 and/or a maximum fill rate constraint 1008. The stock constraint 1010 may comprise a minimum safety stock constraint 1012, a maximum safety stock constraint 1014, and/or a minimum stock constrain 1016. The CWT constraint 1018 may comprise a minimum CWT constraint 1020 and/or a maximum CWT constraint 1022. The back order constrain 1024 may comprise a minimum backorder constraint 1026 and/or a maximum backorder constraint 1028.

FIG. 10 illustrates different options for a user to configure different item and location to fall into one group and set the target. For example, the group targets for set of item and location 1102 may fall into configure item and location for a group 1104. This may then progress to at least one of group unit fill rate target, 1106, group CWT target 1108, and/or group backorder target 1110. This target could be fill rate target or CWT target or EBO target. It is calculated as the independent demand weighted performance of item location within a group. Now, the group targets may be calculated by using the following expression:

$$\text{Group Fill Rate} = \left( \frac{\sum_{j=1}^{M} (ID_j \times PERF_j)}{\sum_{j=1}^{M} ID_j} \right)$$

Figure 12:
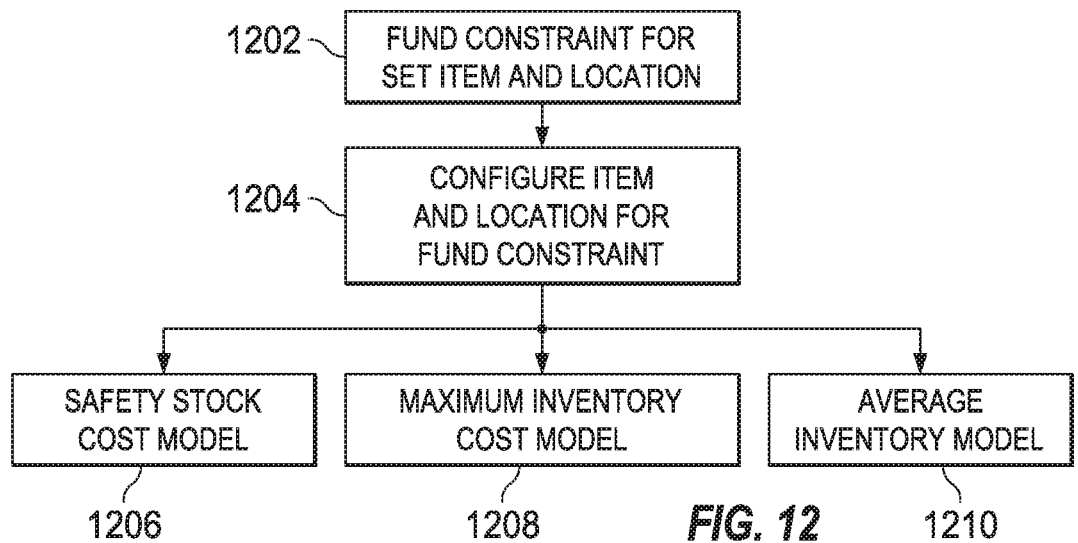
FIG. 12 illustrates a fund constraint that a user may set to optimize the safety stock for a supply chain network.

Where,
j: Identifier used to denote an item and a location
$ID_j$: Independent Demand for an item and a location
$PERF_j$: Performance Measure for an item and a location, it could be Fill Rate or CWT or EBO
M: Total number of items and locations configured to a group In many organizations, budget issues are a typical constraint. FIG. 12 illustrates how the budget/fund constraint may be modeled in an embodiment of the process. A user may need to configure items and locations that fall under the fund constraint. For example, fund constraint for a set of item and location 1202 may fall to configure item and location for fund constraint 1204. This may further fall to at least one of the safety stock cost model 1206, maximum inventory cost model 1208, and/or the average inventory model 1210. Also, this constraint can be applied to any of the three cost models illustrated in FIG. 9.

Figure 13:
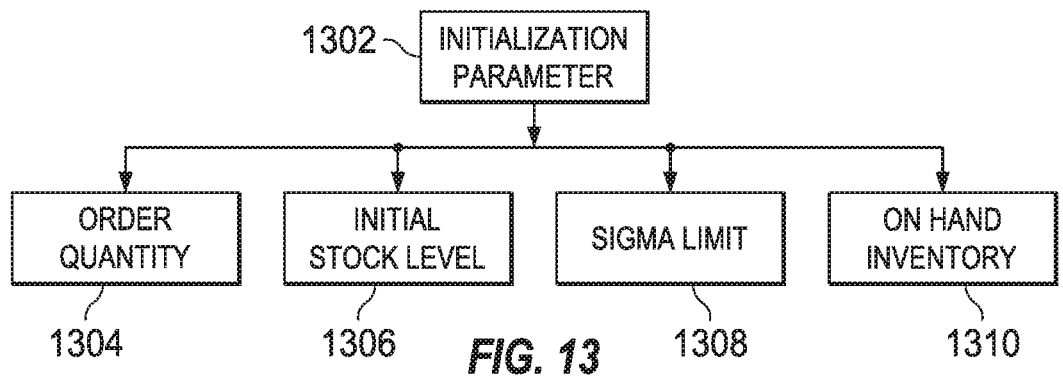
FIG. 13 illustrates different initialization parameters to initialize the solution for an optimization.

FIG. 13 illustrates different options to initialize the solution for the optimizer. Any non-linear optimization process often requires solution initialization 1302 to guarantee the solution converges quickly. There are different options for initialization in this proposed novel approach, including but not limited to Initial Stock Level 1306; On Hand Inventory 1310; Order Quantity 1304; Start Factor (sigma limit) 1308.

Figure 14:
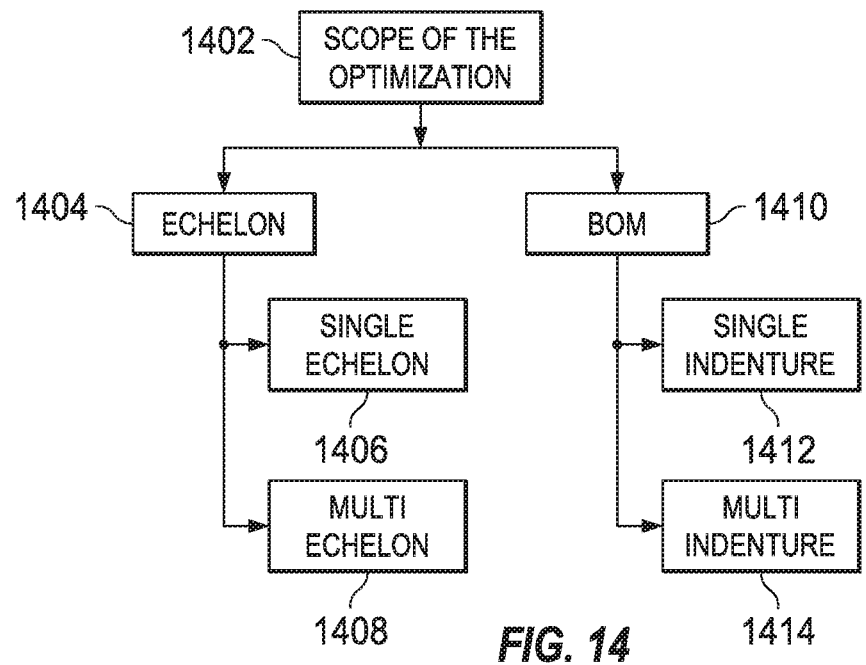
FIG. 14 illustrates a different parameter to choose the scope of the optimization.

FIG. 14 illustrates the different parameters that may set the scope for the optimization 1402. In an embodiment, there are two options to set the scope for the optimization based on echelon 1404: a single echelon 1406 and a multi echelon 1408. Single echelon 1406 will typically not consider the network links. Single echelon may compute fill rate for each item and location without considering interaction effects of other item and location in the network. There are two more options to set the scope for the optimization based on indenture or BOM 1410. Single indenture 1412 will typically not consider impact of bill of material in the distribution network, whereas multi indenture 1414 will typically consider the impact, if bill of material has been modeled in the supply chain network.

Figure 15:
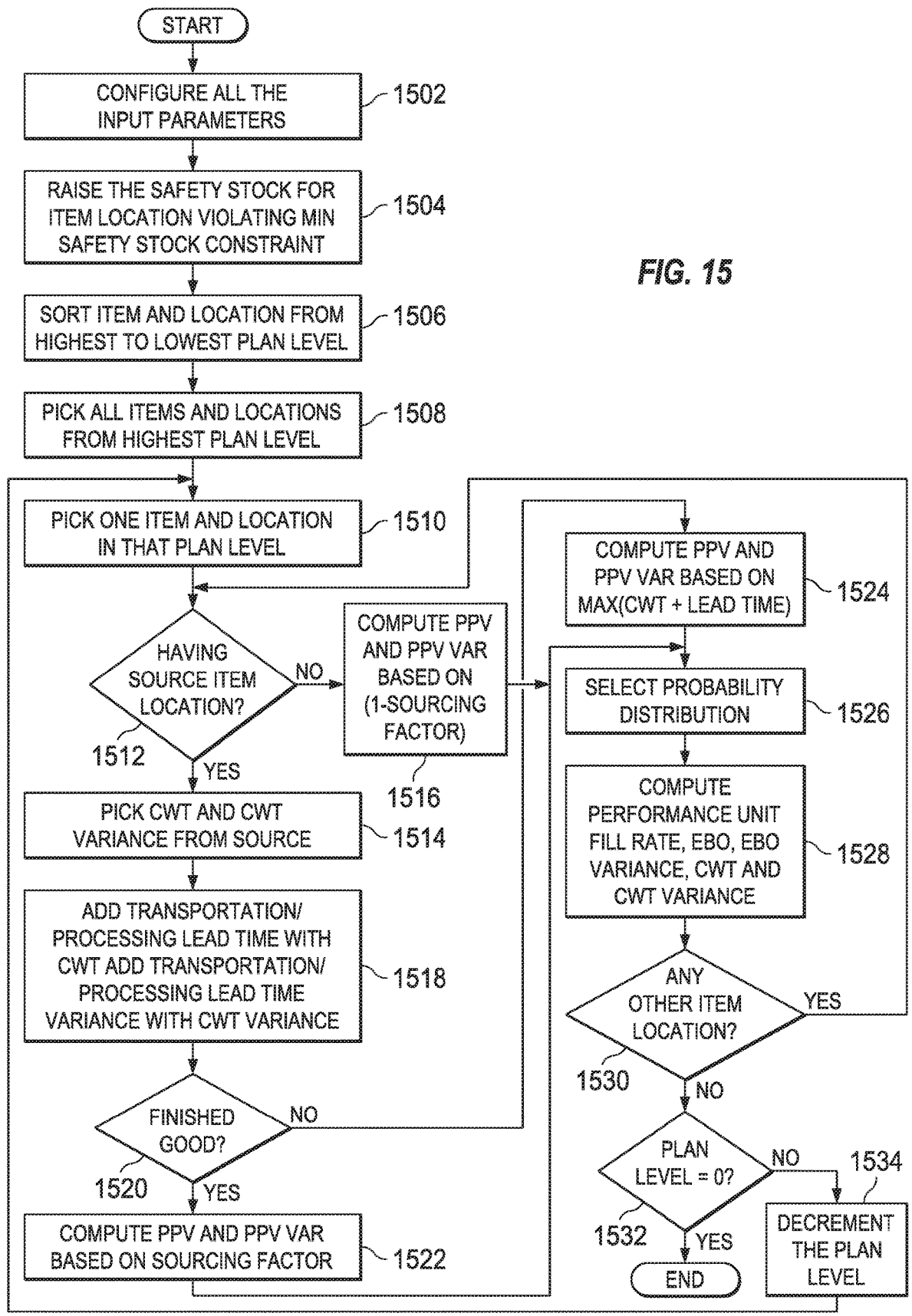
FIG. 15 illustrates an algorithm to determine base line solution.
Figure 16:
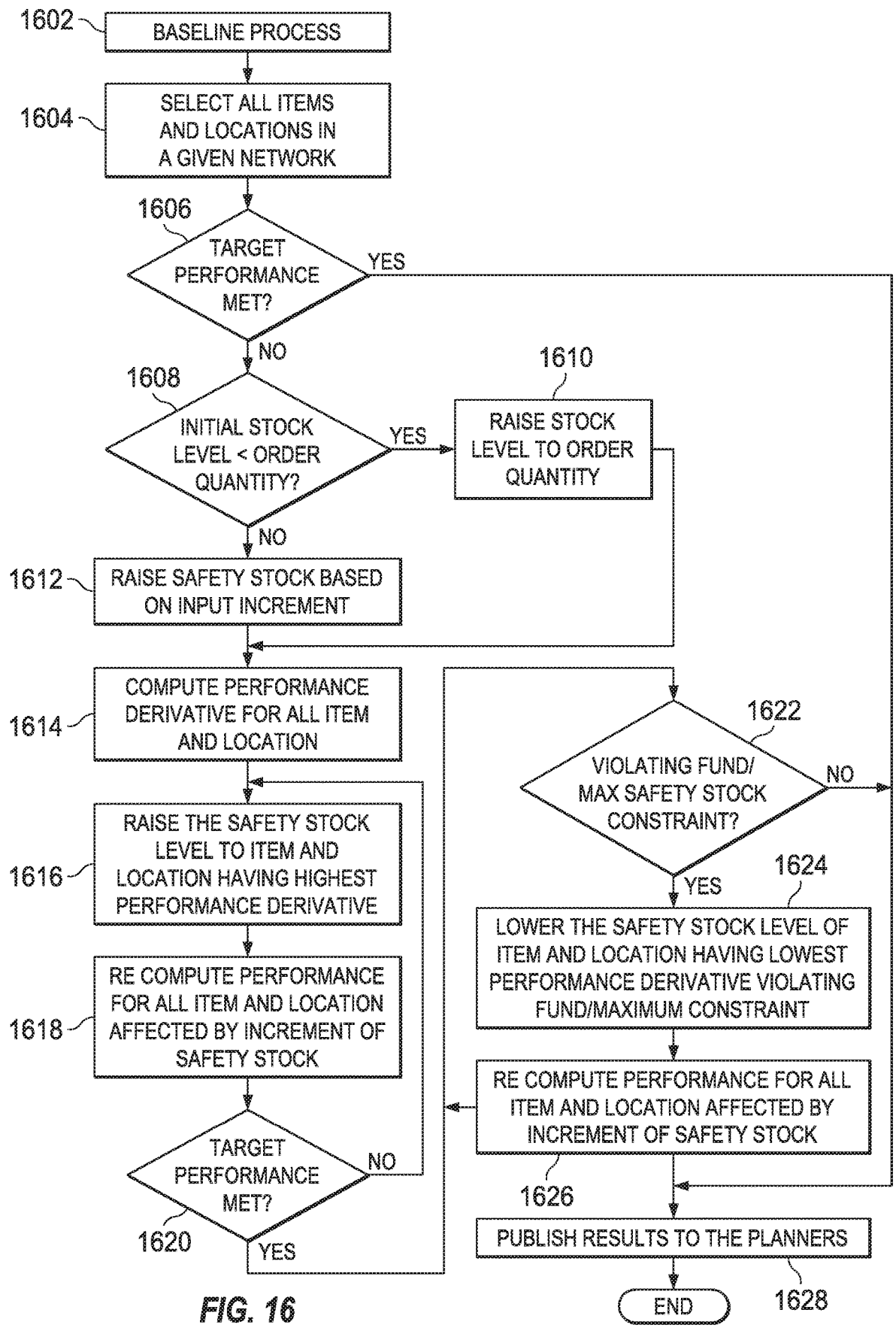
FIG. 16 illustrates an algorithm to optimize safety stock for the given target and constraint.

Finding the global minimum of a non-linear problem with many parameters is always NP-Hard problem. A hill-climbing heuristic algorithm is proposed to solve this NP hard problem. FIGS. 15 and 16 illustrate embodiments of the heuristic methodology to optimize safety stock. In an embodiment, input parameters are configured and safety stock for an item location violating minimum safety stock constraint may be raised. Item and location may then be sorted based on plan level from highest to lowest. The item and location may then be selected one by one from highest to lowest plan level. PPV and PPV variance will be computed based on (1—sourcing factor) for item and location not having any source. If the item and location do have a source, then CWT and CWT variance may be propagated from the source. In this case, if this item and location is not a finished good, then PPV and PPV variance may be computed based on Max (CWT+Lead Time) otherwise, PPV and PPV variance are based on a sourcing factor. Selection of probability distribution may then occur. Distribution may be selected based on PPV and PPV variance. If PPV is greater than a threshold, then the selected distribution will be normal. If PPV is less than the threshold and PPV variance is greater than PPV, then a negative binomial may be selected as distribution to compute metrics. If PPV is less than the threshold and PPV variance is less than the PPV, then binomial distribution may be selected. If PPV is less than the threshold and PPV variance is approximately equal to PPV, then selected distribution may be Poisson.

Unit Fill rate, EBO and EBO variance may be calculated based on selected distribution 1512. CWT and CWT variance may be computed based on following equation.

$$E[CWT] = \frac{EBO}{\mu_D}$$

$$\text{Var}[CWT] = \frac{\text{Var}[EBO] - \frac{\sigma_D^2}{\mu_D} EBO}{\mu_D^2}$$

Where,
$\mu_D$: Mean Daily Demand (MDD)
$\sigma^2_D$: Mean Square Error (MSE)
Var (EBO): Variance of Backorder
EBO: Expected Backorder The same computation may happen for all items and locations in all plan levels. Thus performance may be computed for all item and location based on input data condition called baseline solution. An algorithm may try to evaluate target performance with the current performance. If target performance is met, then performance measures may be published to planners. If the target performance is not, then a determination may be made whether initial stock level is less than reorder quantity for each item and location. If the initial stock level is less than reorder quantity for the item and location, then stock level of the corresponding item and location may be increased to order quantity, otherwise, it will increment safety stock using safety stock increment provided by the user. Performance derivative may be computed as ratio of change in the performance to change in cost. Item and location having highest performance may also be selected for increment. The performance may be recomputed for item and location that got impacted due to increase in the safety stock. This iterative procedure may continue until performance target is met.

In this algorithm, a user may have flexibility to model fund-constraint and maximum safety stock-constraint. If fund and maximum safety stock constraints are violated because of performance target, then the item and location having a lowest performance derivative may be selected to decrease the safety stock. The performance measure may be recomputed for the item and location that got impacted due to reduction in the safety stock. This iteration may continue at least until the fund constraint or maximum safety stock is respected. The performance measures such as reorder point, safety stock, unit fill rate, CWT, CWT SD, mean daily demand, stock level, average stock level etc. may be published to the planners.

Referring now specifically to FIG. 15, in an embodiment of the methodology, all the input parameters may be configured 1502. The safety stock for an item location violating the minimum safety stock constraint may then be raised 1504. Item(s) and location(s) may be sorted from the highest to the lowest plan level 1506. All items and locations from the highest plan level may be picked 1508, and then one item and location from that specific plan level may be picked 1510.

A determination may then be made whether the item and location have a source 1512. If the item and location do have a source, then the CWT and CWT-variance from the source may be picked or selected 1514. Next, the transportation/processing lead time may be added to the CWT, and the transportation/processing lead time variance may be added to the CWT variance 1518. A determination may then be made if the product is a finished good 1520. If the product is a finished good, the PPV and PPV variance may be computed based on a source factor 1522. If the product is not a finished good, the PPV and PPV variance may be computed based on a maximum CWT plus lead time 1524. A probability distribution may then be selected 1526.

If the item and location do not have a source, then the methodology may proceed to selecting a probability distribution 1526. Once the probability distribution is selected, performance unit fill rate, EBO, EBO variance, CWT, and CWT variance may then be computed 1528. A determination is made whether there is any other item location 1530. If there is another item location, the methodology may return to determining whether the item location has a source 1512 and proceeding with another item location. If there is no other item location, a determination is made whether the plan level equals zero 1532. If the plan level equals zero, then the methodology may finish. If the plan level does not equal zero, the methodology may comprise decrementing the plan level 1534, then return to picking one item and location at the specific plan level 1510.

Referring now specifically to FIG. 16, an embodiment of the methodology begins with a base line process 1602, followed by selection of all items and locations in a given network 1604. A determination may then be made whether the target performance has been met 1606. If the target performance has been met, the methodology may progress to publication of the results to the planners 1628. If the target performance has not been met, the methodology may determine whether the initial stock level is less than the order quantity 1608. If the initial stock level is less than the order quantity, the stock level may be raised to the order quantity 1610. If the initial stock level is not less than the order quantity, the safety stock may be raised based on an input increment 1612.

The methodology may further comprise computation of a performance derivative for all items and locations 1614. The safety stock level of items and locations having the highest performance derivative may then be raised 1616. Performance for all item and locations affected by increment of safety stock may be recomputed 1618 in an embodiment, followed by a determination whether the target performance has been met 1620. If the target performance has not been met, the methodology may return to raising the safety stock level of items and locations having the highest performance derivative 1616. If the target performance has been met, then the methodology may progress to determining whether results violate the fund/max safety stock constraint 1622. If not, the methodology may then publish results to the planners 1628 and complete the methodology. If results do violate fund/max safety stock constraint, then the methodology may comprise lowering the safety stock level of the item and location having the lowest performance derivative violating the fund/max constraint 1624. Re-computation of the performance derivative for all item and location affected by decrement of safety stock 1626 may occur. From here, the system or methodology may return to determining whether the results or target performance violate the fund/max safety constraint 1622 or publish the results to the planners 1628.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system to reduce computational run time of a computer, the system comprising:
   a supply chain network comprising two or more supply chain entities, two or more nodes, and two or more computers, the two or more nodes comprising an inventory of an article and the two or more computers each comprising one or more memory units and one or more processing units collectively configured to:
      determine a first delay time from at least one second plan level node in an at least second indenture plan level to at least one first plan level node in a first indenture plan level, the at least one second plan level node comprising two or more second plan level nodes and the at least one first plan level node comprising two or more first plan level nodes, each of the two or more second plan level nodes comprising a second plan level source for at least one of the two or more first plan level nodes and each of the two or more first plan level nodes comprising a first plan level source for a finished good;
determine a second delay time from the at least one first plan level node in the first indenture plan level to the finished good; and
determine an optimal inventory target based, at least in part, on the first and second delay times thereby reducing computational run time of the two or more computers,
wherein at least one of the two or more supply chain entities adjusts the inventory based, at least in part, on the optimal inventory target.

2. The system of claim 1, wherein determine the first delay time comprises:
determine a second plan level fulfillment problem variable (PPV) and second plan level PPV standard deviation between each second plan level source and each associated first plan level node;
determine a second plan level critical value between each second plan level source and each associated first plan level node; and
determine a second plan level delay utilizing a two sigma limit for any second plan level critical value less than or equal to two and the second plan level critical value as a sigma limit for any second plan level critical value greater than two, wherein a largest second level numerical delay comprises a second level bottleneck between the at least second plan level and the first level.

3. The system of claim 2, wherein determine the second plan level PPV and the second plan level PPV standard deviation comprises determine a second mean lead time, a second lead time standard deviation, a second mean daily demand, and a second mean square error between each second plan level source and each associated first plan level node to compute the PPV and the PPV standard deviation between each second plan level source and each associated first plan level node.

4. The system of claim 3, wherein determine the second delay time from the at least one first plan level node in the first indenture plan level to the finished good comprises:
add the lead time and the bottleneck lead time standard deviation of the bottleneck between the at least second plan level and the first level;
determine a first plan level PPV and a first plan level PPV standard deviation between each first plan level source and the finished good;
determine a first plan level critical value between each second plan level source and each associated first plan level node; and
determine a first plan level delay utilizing a two sigma limit for any first plan level critical value less than or equal to two and the first plan level critical value as a sigma limit for any first plan level critical value greater than two.

5. The system of claim 4, wherein a largest first plan level numerical delay comprises a first plan level bottleneck between the at least first plan level and the finished good.

6. A computer-implemented method of determining optimal inventory targets in bill of materials in a multi-echelon supply chain network thereby reducing computational run time of a computer, the method comprising:
determining a first delay time from at least one second plan level node in an at least second indenture plan level to at least one first plan level node in a first indenture plan level, the at least one second plan level node comprising two or more second plan level nodes and the at least one first plan level node comprising two or more first plan level nodes, each of the two or more second plan level nodes comprising a second plan level source for at least one of the two or more first plan level nodes, and each of the two or more first plan level nodes comprising a first plan level source for a finished good;
determining a second delay time from the at least one first plan level node in the first indenture plan level to the finished good;
determining an optimal inventory target based, at least in part, on the first and second delay times thereby reducing computational run time of the computer; and
adjusting, by a supply chain entity in a supply chain network, an inventory of at least one node based, at least in part, on the optimal inventory target.

7. The method of claim 6, wherein determining the first delay time comprises:
determining a second plan level fulfillment problem variable (PPV) and second plan level PPV standard deviation between each second plan level source and each associated first plan level node;
determining a second plan level critical value between each second plan level source and each associated first plan level node; and
determining a second plan level delay utilizing a two sigma limit for any second plan level critical value less than or equal to two and the second plan level critical value as a sigma limit for any second plan level critical value greater than two, wherein a largest second level numerical delay comprises a second level bottleneck between the at least second plan level and the first level.

8. The method of claim 7, wherein determining the second plan level PPV and the second plan level PPV standard deviation comprises determining a second mean lead time, a second lead time standard deviation, a second mean daily demand, and a second mean square error between each second plan level source and each associated first plan level node to compute the PPV and the PPV standard deviation between each second plan level source and each associated first plan level node.

9. The method of claim 8, wherein determining the second delay time from the at least one first plan level node in the first indenture plan level to the finished good comprises:
adding the lead time and the bottleneck lead time standard deviation of the bottleneck between the at least second plan level and the first level;
determining a first plan level PPV and a first plan level PPV standard deviation between each first plan level source and the finished good;
determining a first plan level critical value between each second plan level source and each associated first plan level node; and
determining a first plan level delay utilizing a two sigma limit for any first plan level critical value less than or equal to two and the first plan level critical value as a sigma limit for any first plan level critical value greater than two.

10. The method of claim 9, wherein a largest first plan level numerical delay comprises a first plan level bottleneck between the at least first plan level and the finished good.

11. A non-transitory computer-readable medium embodied with software to reduce computational run time of a computer, the software when executed by one or more computers is configured to:
- determine a first delay time from at least one second plan level node in an at least second indenture plan level to at least one first plan level node in a first indenture plan level, the at least one second plan level node comprising two or more second plan level nodes and the at least one first plan level node comprising two or more first plan level nodes, each of the two or more second plan level nodes comprising a second plan level source for at least one of the two or more first plan level nodes, and each of the two or more first plan level nodes comprising a first plan level source for a finished good;
- determine a second delay time from the at least one first plan level node in the first indenture plan level to the finished good;
- determine an optimal inventory target based, at least in part, on the first and second delay times thereby reducing computational run time of the computer; and
- adjust an inventory of at least one node based, at least in part, on the optimal inventory target.

12. The computer-readable medium of claim 11, wherein determine the first delay time comprises:
- determine a second plan level fulfillment problem variable (PPV) and second plan level PPV standard deviation between each second plan level source and each associated first plan level node;
- determine a second plan level critical value between each second plan level source and each associated first plan level node; and
- determine a second plan level delay utilizing a two sigma limit for any second plan level critical value less than or equal to two and the second plan level critical value as a sigma limit for any second plan level critical value greater than two, wherein a largest second level numerical delay comprises a second level bottleneck between the at least second plan level and the first level.

13. The computer-readable medium of claim 12, wherein determine the second plan level PPV and the second plan level PPV standard deviation comprises determine a mean lead time, a second lead time standard deviation, a second mean daily demand, and a second mean square error between each second plan level source and each associated first plan level node to compute the PPV and the PPV standard deviation between each second plan level source and each associated first plan level node.

14. The computer-readable medium of claim 13, wherein determine the second delay time from the at least one first plan level node in the first indenture plan level to the finished good comprises:
- add the lead time and the bottleneck lead time standard deviation of the bottleneck between the at least second plan level and the first level;
- determine a first plan level PPV and a first plan level PPV standard deviation between each first plan level source and the finished good;
- determine a first plan level critical value between each second plan level source and each associated first plan level node; and
- determine a first plan level delay utilizing a two sigma limit for any first plan level critical value less than or equal to two and the first plan level critical value as a sigma limit for any first plan level critical value greater than two.

15. The computer-readable medium of claim 14, wherein a largest first plan level numerical delay comprises a first plan level bottleneck between the at least first plan level and the finished good.

* * * * *

UNITED STATES PATENT AND TRADEMARK OFFICE
CERTIFICATE OF CORRECTION

PATENT NO. : 10,579,946 B2
APPLICATION NO. : 15/983987
DATED : March 3, 2020
INVENTOR(S) : Konanur et al.

It is certified that error appears in the above-identified patent and that said Letters Patent is hereby corrected as shown below:

In the Specification

Column 5, Line 50, should read as follows:
Determining a delay from the 2nd indenture to the 1st indenture may first comprise computing the procurement problem variable (PPV) and PPV SD for each source and destination. PPV may also relate to the lead time variation. Examples of the PPV and PPV standard deviations are shown in TABLE 2. An equation which is used to compute PPV and PPV SD is given below:

$$PPV = \mu_D \mu_L$$
$$PPV\ SD = \sqrt{\mu_L \sigma_D^2 + \mu_D^2 \sigma_L^2}$$

Where,
$\mu_D$ : Mean Daily Demand (MDD)

Signed and Sealed this
Twenty-first Day of April, 2020

Andrei Iancu
*Director of the United States Patent and Trademark Office*